United States Patent [19]
Bonnard

[11] Patent Number: 4,479,787
[45] Date of Patent: Oct. 30, 1984

[54] SPEED GEAR DEVICE AT THE CRANK-WHEEL OF BICYCLES AND SIMILAR VEHICLES

[75] Inventor: Pierre Bonnard, Beynes, France
[73] Assignee: Establissements LE SIMPLEX, France
[21] Appl. No.: 355,616
[22] Filed: Mar. 8, 1982
[30] Foreign Application Priority Data Mar. 17, 1981 [FR] France ............... 81 05786

[51] Int. Cl.³ ............................................ F16H 11/00
[52] U.S. Cl. .................................. 474/82; 474/127
[58] Field of Search .............. 474/127, 122, 119, 82, 474/81, 80, 78

[56] References Cited

U.S. PATENT DOCUMENTS

| 3,730,012 | 5/1973 | Juy .................. | 474/82 |
| 3,813,955 | 6/1974 | Huret et al. ...... | 474/82 |
| 3,890,847 | 6/1975 | Dian ................. | 280/238 |
| 4,030,374 | 6/1977 | Isobe ................ | 474/82 |
| 4,078,444 | 3/1978 | Huret ............... | 474/82 |
| 4,226,130 | 10/1980 | Isobe ............... | 474/82 |
| 4,237,743 | 12/1980 | Nagano ............ | 474/82 |
| 4,279,172 | 7/1981 | Nagano et al. .. | 474/82 |
| 4,279,605 | 7/1981 | Egami .............. | 474/82 |

FOREIGN PATENT DOCUMENTS

| 908832 | 4/1954 | Fed. Rep. of Germany ........ | 474/80 |
| 2833523 | 2/1979 | Fed. Rep. of Germany ........ | 474/80 |
| 432766 | 3/1948 | Italy ..................................... | 474/80 |
| 260767 | 3/1949 | Sweden .............................. | 474/82 |
| 2036895 | 7/1980 | United Kingdom ................ | 474/82 |

Primary Examiner—Lawrence J. Staab
Assistant Examiner—Dwight G. Diehl
Attorney, Agent, or Firm—Eric P. Schellin

[57] ABSTRACT

The speed gear device is particularly distinctive in that it includes a third movable fork side (11) mounted in a movable manner between the internal side (9a) and the external side (9b) of a fork (9) for guiding the chain (A) with a substantial spacing, in order to act in connection with the control means when the speed gear device is actuated, to guide the chain from a sprocket wheel to the other sprocket wheel.

7 Claims, 11 Drawing Figures

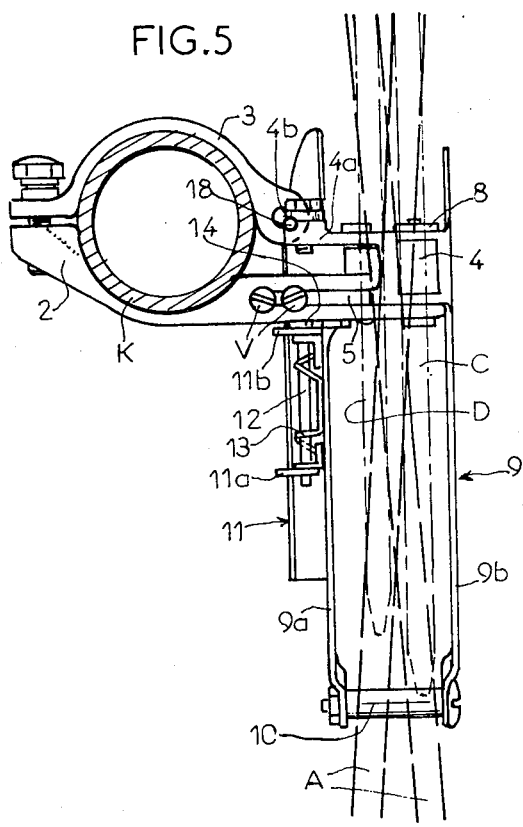
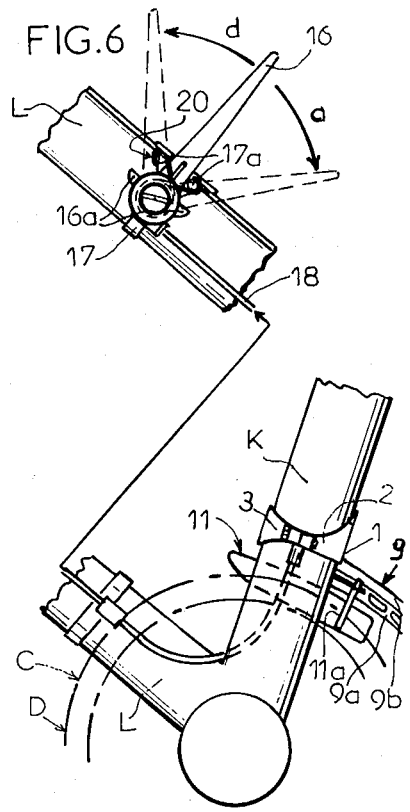
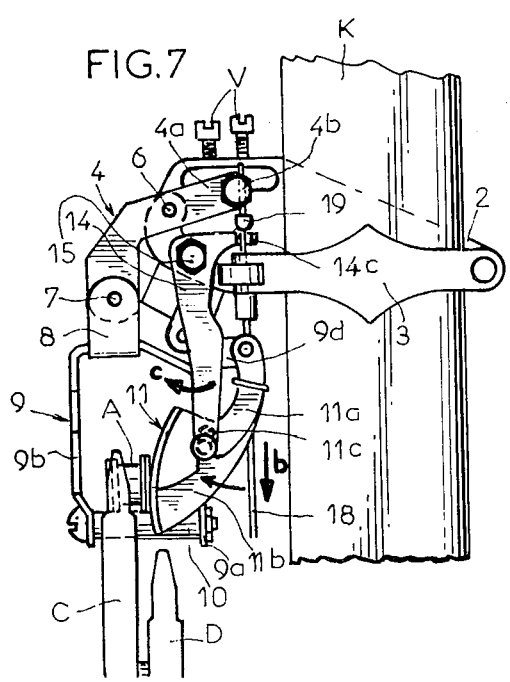
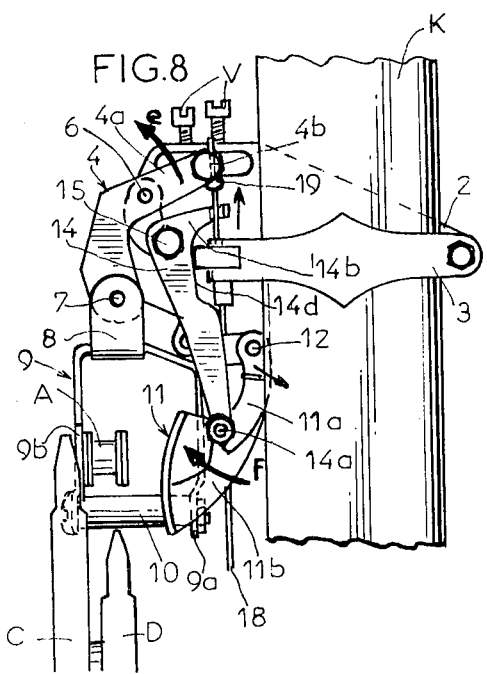

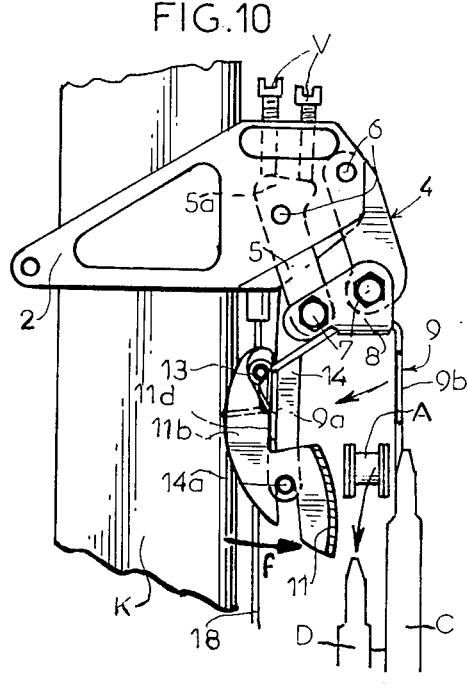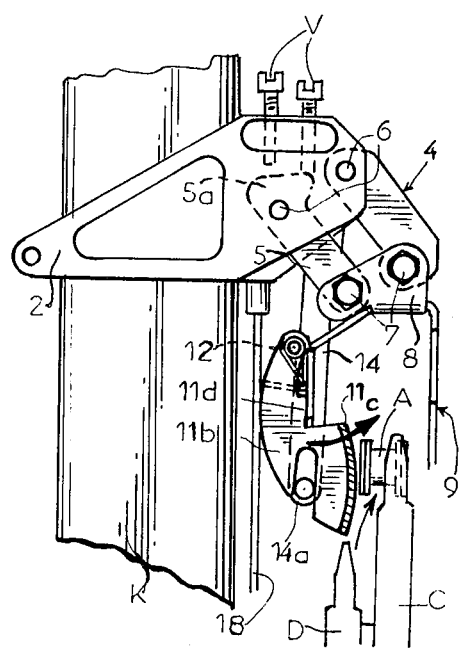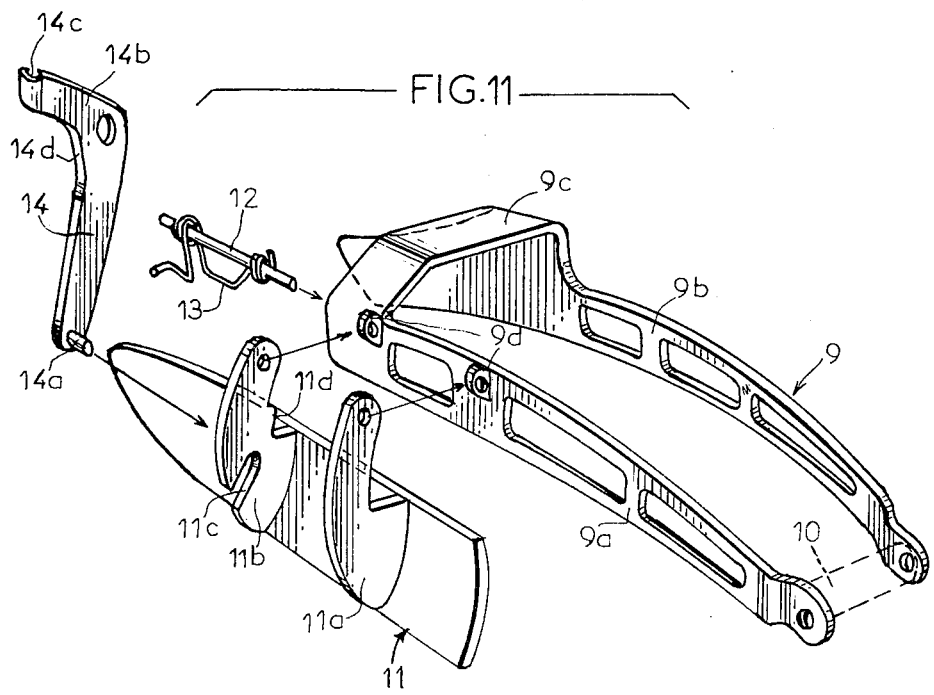

SPEED GEAR DEVICE AT THE CRANK-WHEEL OF BICYCLES AND SIMILAR VEHICLES

BACKGROUND OF THE INVENTION

The invention is directed to a speed gear device for the crank-wheel of bicycles and similar vehicles.

1. Field of the Invention

The invention belongs to the technical field of commodities for bicycles and similar engines.

2. Description of the Prior Art

It is a well-known fact that the speed gear devices for the crank-wheel of bicycles and similar vehicles consist chiefly of a fork with two sides or limbs between which the chain is passed, and of a hinged parallelogram mechanism or the like for the transverse shifting of said fork, so that the chain will be brought upon the sprocket of the crank-wheel which has been selected for driving the vehicle. The mechanism is actuated by the driver using a hand lever and cable system, or a lever system, or other similar device.

A first disadvantage is that it is often difficult for the driver to accurately place the control hand lever or lever in the angular position corresponding to a correct transverse shifting of the chain in order to bring the latter in the correct winding position on the selected sprocket wheel. When the chain is not located correctly, the operation becomes noisy, damages may occur, and the chain may come off, which makes it necessary to adjust it back again.

A further disadvantage, as may be seen in FIG. 1 of the drawings, resides in the fact that chain (A) is passed between the sides (B1-B2) of the fork which is designated generally by reference letter (B). The chain will be shifted transversely and wound around one of the sprockets (C-D) of the crank-wheel of the bicycle, in order to modify the gear ratio and the driving action, this in conjunction with the winding of the chain around one of the sprockets (E-F-G-H-I . . . ) of the free wheel wedged to the hub (J) of the rear wheel of the bicycle. On account of the number of the free wheel sprockets, and also due to the fact that the crank-wheel is equipped with at least two sprocket wheels, the chain (A) tends to occupy slanting positions which have a very substantial inclination relative to the planes of the sprocket wheels. The result is that friction of the chain against either one of the sides (B1-B2) of the fork is produced, thereby producing a quick wearing off and damaging of the fork sides and the chain, unpleasant rubbing and noises, multiple and repetitive hammering of the ends of the chain links against the sides of the fork.

SUMMARY OF THE INVENTION

The speed gear device for the crank-wheel in accordance with the invention eliminates these disadvantages, and is mainly characterized in that the spacing between the sides of the forks is substantially lager than the usual spacing, and as such, except at times when the actions for changing the gear ratio take place, the chain will not be in contact with either fork side in the most slanted winding positions of the chain on the outermost sprockets and sprocket wheels. A third fork side or equivalent means for urging the chain is mounted pivotally or movable in any other way beneath and relative to the internal side of the fork (the side nearmost the frame) with an elastic return system and a stop in order to maintain in the inactive position the movable fork side in a position away from the external fork side more or less in the plane of the internal fork side. A pivotal knee lever means or the like is hinged to a fixed support pin or other fixed part and connected in a loose manner and hinged to the movable fork side, said knee lever being pivoted when the control lever or hand lever of the speed gear device is shifted angularly, from a pre-determined neutral position, in a direction up to a limit position. The movable fork side is moved toward the external fork side urging the chain onto the sprocket wheel of the larger diameter. The angular shifting in the reverse direction of the control lever from the neutral position to a limit position actuates the swinging means of the hinged parallelogram system while moving together the sides of the fork, the external fork side pulling the chain on to the sprocket wheel of the smaller diameter while the movable fork side, at the same time, is moved toward the external fork side by the combined action of the connections of with the internal fork side and the knee lever. The movable fork side is in any case returned, more or less, within the plane of the internal fork side immediately after the transverse shiftings of the chain.

These and other characteristics will be apparent from the following detailed description.

BRIEF DESCRIPTION OF THE DRAWINGS

To make the object of the invention better understood, without however restricting it thereby, the invention will be described with reference to the attached drawings, in which:

FIG. 5 is a plane view of the speed gear device in accordance with FIG. 2, the dashed lines illustrating the inclinations of the chain wound round outermost rear wheel sprockets, and the absence of contact with the fork sides.

FIG. 6 is a lateral view of a diagrammatical character, illustrating the speed gear device in accordance with the invention mounted on the saddle/crank-wheel tube and the control lever thereof mounted on the frame tube; the control lever being illustrated by solid lines in the neutral position which is accurately pre-determined. The limits of the angular shiftings in either direction for each control have been illustrated in dashed lines.

FIGS. 7 and 8 are front face views illustrating the speed gear device respectively in the position of the passage of the chain from the smaller to the larger sprocket wheel, and from the larger to the smaller sprocket wheel.

FIGS. 9 and 10 are views from the rear illustrating the speed gear device respectively in the position of the passage of the chain from the smaller sprocket wheel to the larger one, and from the larger sprocket wheel to the smaller one.

FIG. 11 is a perspective view illustrating separately the elements of the speed gear device which are necessary for the embodiment of the invention.

DETAILED DESCRIPTION

Figure 1:
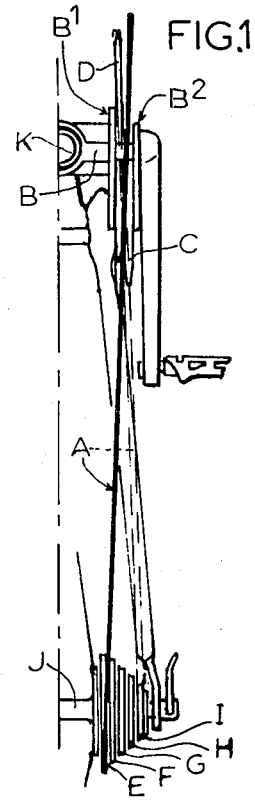
FIG. 1 is a plane view of a diagrammatical character, showing the slanting of the chain relative to the plane of the sprocket wheels and of the rear wheel sprockets, when the chain is passed round the outermost sprockets of the free wheel and either one of the sprocket wheels of the crank-wheel. Two outermost slanting positions of the chain have been illustrated, one of these positions being shown by solid lines, the other one being shown by dashed lines.

In order to make the object of the invention more concrete, the object of the invention will be described now in a non restrictive form of embodiment illustrated in the Figures of the drawings.

In accordance with the example illustrated, the speed gear device includes a support (2) which is secured by means of half-collars (3) to the tube (K) of the bicycle, and is provided in a well-known manner with arms (4, 5) linked at (6) to the support (2) and at (7) to a yoke (8) which is intended for carrying the guiding fork (9) of the chain. Screws (V) passed through the support (2) can be adjusted for the support of the contoured end (5a) of arm (5), in order to provide a fork clearance varying in accordance with the number of sprocket wheels.

The fork (9) is chiefly constituted by an internal fork side (9a) and an external fork side (9b) which are connected adjacent to one end by a cross piece (9c) made fast by any well-known means with the yoke (8), and at the other end by a spacer (10), as illustrated more particularly in the FIG. 11.

The spacing between the internal and external fork sides is substantially larger than the usual spacing, so that in the inactive position, i.e. when no gear change over action is taking place, the chain (A) will never be in contact with either fork side, even when the chain is slanted at a maximal angle, as illustrated in FIGS. 1 and 5. When the chain is wound round the larger sprocket wheel (C) and the larger rear wheel sprocket (E), or conversely, round the smaller sprocket wheel (D) and the larger rear wheel sprocket (I), and this even in the case of free wheels with more than five gears.

This arrangement with a substantial spacing of the fork sides does not allow a correct guiding of the chain when the latter is to be shifted toward either one of the sprocket wheels of the crank-wheel; it has been contemplated therefore, in accordance with the invention, to decrease the spacing of the fork sides during the gear change over actions only.

Figure 2:
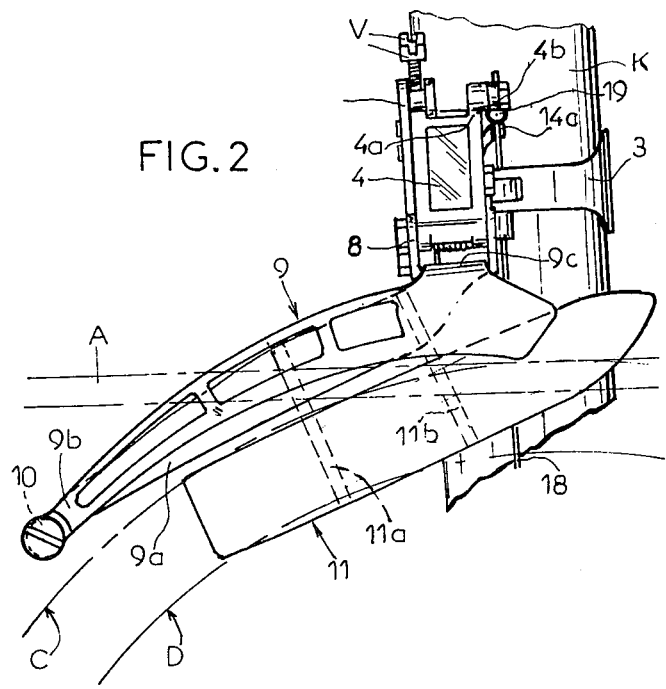
FIG. 2 is a lateral view illustrating a form of embodiment of the speed gear device of the crank-wheel in accordance with the invention, mounted on the saddle/crank-wheel tube of a bicycle. The chain and the sprocket wheels of the crank-wheel have been illustrated by dashed lines.

For this purpose, a third fork side (11) or like organ for urging the chain is mounted movable relative to the internal fork side (9a). According to the non restrictive example which has been illustrated, the fork side (11) has a surface of convex cross-section for the contact with the chain, and extends in the inactive position more or less beneath and within the plane of the internal fork side (9a), with a rear end near the spacer (10) and a forward end protruding relative to the forward ends of the fork sides (9a-9b) (FIG. 2).

At two medial and spaced points of the length, the fork side (11) is supporting two crank arms (11a-11b) which are linked to a pin (12) supported by two bearing portions or eyelets (9d) with which the internal fork side (9a) is provided (FIG. 11).

Figure 3:
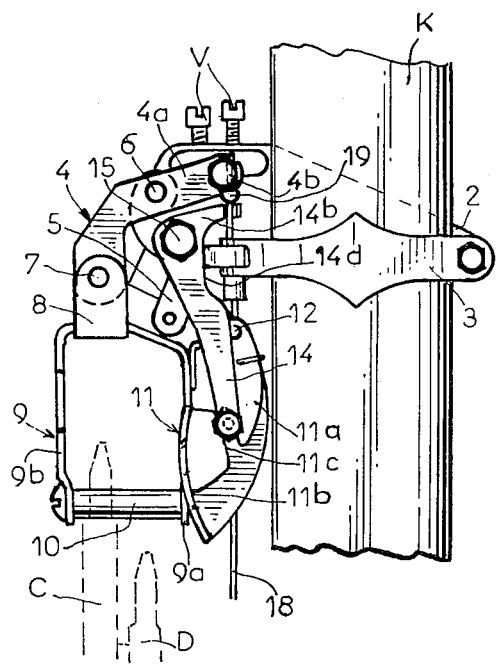
FIGS. 3 and 4 are respectively a front face view and a rear view of the speed gear device in accordance with the invention.
Figure 4:
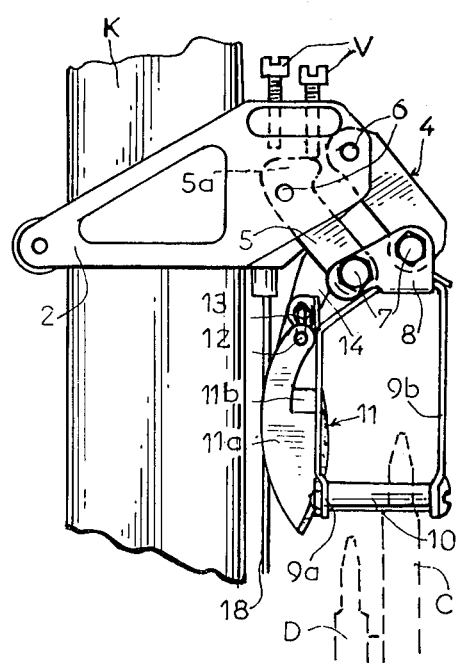

As will be clearly seen from FIGS. 3, 4, 5, a V-shaped spring (13) is wound round pin (12) and abuts at one end on the arm (11b) and at the other end on the fork side (9a), in order to return permanently the fork side (11) to a position spaced from the external fork side.

The arm (11b) has in the rear portion thereof an opening or slot (11c) for the engagement of a finger (14a) supported by the end of a knee lever (14) which is swivelled at (15) to the support (2). The other portion (14b) thereof has a notch (14c) in which the connection organ between the speed gear device and the control means thereof (FIGS. 3, 6 and 11) can be engaged for sliding motion.

The control means as diagrammatically illustrated in FIG. 6, is of the type with hand lever or lever (16) journaled on a collar (17) for fastening to the frame tube (L), the arrangement being thus that the control means, when not operated, will occupy (solid line FIG. 6) a perceptible neutral position or dead center position, easily felt or spotted by the user.

From the dead center position, the hand lever is operated in unison with any elastic means (20) tensioned in either direction up to a limit position in each direction. The limit position may be constituted by bosses (16a) of the hand lever which abut against projections (17a) formed on a stationary organ.

The connecting organ between the lever (16) and the gear device is preferably a half-rigid rod (18), i.e. a nonextensible wire which is capable of following in broad curves the contour of the frame between the crank case and the top of the diagonal tube or other element of the bicycle to which the lever is secured.

The connection between the rod (18) and the speed gear device is provided through the intermediary of a stop which can be a projection (19) integral with the rod (18). The rod (18) extending from the control lever (16) is passed through the notch (14c) of the lever (14) then through a hole or orifice (4b) which serves as a guide for sliding motion and is made within the end of an extended portion (4a) of arm (4). The stop (19) is placed between the notch (14c) and the orifice (4b), and the rod (18) is thereby held for free sliding motion through the orifice (4b) and the notch (14c).

The operation of the speed gear device will be described now with reference more particularly to FIGS. 6-10 of the drawings.

When control lever (16) is placed in the neutral position (solid lines, FIG. 6), the fork (9) of the speed gear device is placed as illustrated more particularly in FIG. 3, with the movable fork side (11) more or less in alignment with the internal fork side (9a). It will be assumed for instance that the chain (A) is wound round the smaller sprocket wheel (D) of the crank-wheel. When it is desired to place the chain round the larger sprocket wheel (C) of the crank-wheel, an impulse (arrow a, FIG. 6) is given to the control lever (16) in order to pull the rod (18) in the direction of arrow (b) (FIGS. 7 and 9).

During this action, the stop (19) integral with the rod (18) abuts against the end (14b) of the lever (14) and drives the same for rotation in the direction of arrow C, FIGS. 7 and 9, which has the effect, due to the connection of the lever (14) with the fork side (11) by means of the finger (14a) engaged within the slot (11c), to cause the fork side (11) to be pivoted toward the external side (9b) of the fork, against the return spring (13) thereof.

During this step, the finger (14a) is moved within the slot (11c) while remaining coupled to the fork side (11).

It will be noted that as the mechanism is in the nonoperative position, the fork side (11) is itself maintained in this position (position of maximal spacing from the external fork side) on the one hand by means of the finger (14a) in abutment at the bottom of slot (11c), and on the other hand by means of the abutment of the inside edge (14d) of the knee lever (14) upon the opposed portion of the support (2), as illustrated in FIG. 3. In the pivoted position, the fork side (11) is abutted by the inside edge (11d) of either one of the arms (11a-11b) or of these both arms against the internal fork side (9a), as may be seen in FIG. 9.

Therefore, the chain is urged positively by the movable fork side (11) to be wound round the larger sprocket wheel with a maximal accuracy and guiding, as the chain is securely held between the external fork side and the movable fork side.

As soon as the lever (16) is released and automatically shifted back to the dead centre position, the movable fork side (11) is returned to the non-operative position; the projection (19) of rod (18) is urged back by the end (14b) of the lever (14), and the rod (18) comes back to its initial position.

Conversely, when it is desired to change over the chain (A) from the larger sprocket wheel (C) to the smaller sprocket wheel (D), as illustrated in FIGS. 8 and 10, the lever (16) is acutated in the reverse direction, with an impulse in the direction of arrow d, FIG. 6, with the result that the rod (18) is urged back, while being conveniently guided in its half-rigid travel.

In this action, the rod (18) slides within the notch (14c) of the lever (14), and the end (4a) of arm (4) is urged by the projection (19) integral with the rod (18), said arm (4) being thus pivoted in the direction of arrow (e) FIG. 8, while driving thereby the fork (9). During this step, the chain (A) is therefore urged positively by the external side (9b) of the fork, in order to be changed over to the smaller sprocket wheel (C).

Concurrently, as the fork is shifted relative to the mobile fork side which remains in position due to the fact the lever (14) is not actuated, said mobile fork side (11) is pivoted relative to the finger (14a), as illustrated by arrows f, FIGS. 8 and 10, so that the mobile fork side will be oriented to receive in an abutting and retaining manner the chain urged by the external fork side. In this case, there is only a swinging motion of the mobile fork side around the finger, and there is no angular shifting with the pin (12) as the rotational axis, contrary to what occurs in the reverse action.

It must be noted that these alternative forms of embodiment may be introduced while remaining still within the scope of the invention.

For instance, a conventional flexible cable may be substituted for the half-rigid rod (18) for the control of the shiftings, while taking care to mount a return spring which will act when the cable is released to bring back the chain around the smaller sprocket wheel by swinging of one or both of the arms of the parallelogram which is linked with the fork.

Likewise, the mobile fork side (11) can be mounted slidingly relative to the internal fork side, with also a spring return to be brought back within the plane of the internal fork side in the non-operative position.

The advantages are clearly apparent from the description; moreover, the following features are more particularly pointed out:

the simplification in the construction of the speed gear device, as the only addition consists of a mobile fork side together with the mounting means, the spring thereof and the connecting knee lever;

the correct guiding of the chain during the change over action due to the fact that the chain is positively urged by means of the mobile fork side and retained by the external fork side when the chain is to be geared over the larger sprocket wheel, and that the chain is positively urged by means of the external fork side and retained by the mobile fork side when the chain is to be geared down to the smaller sprocket wheel; and the substantial spacing of the sides of the fork, whereby any contact with the chain is prevented, even in the case of a maximal disalignment of the chain wound round the sprockets of a free wheel with at least five sprockets.

The invention is not limited in any way to the use nor to the form of embodiment of the various parts thereof which have been more particularly described; on the contrary, any alternative form of embodiment remains within the scope of the invention.

I claim:

1. A device for changing gears on a bicycle and similar engines wherein the device is mounted on a fixed support of a bicycle frame adjacent a crank-wheel of a bicycle, gears are changed by transferring a chain from one sprocket to another thereby changing the gearing of a bicycle or similar device, comprising:

a fork having an internal side and an external side between which a chain passes, the spacing between the sides of said fork is substantially larger than the normal spacing for a conventional fork assembly, a chain passing through said fork will not contact either fork side even in the most slanted winding positions of a chain except during a gear changing procedure;

a hinged parallelogram device is secured to a fixed support on a bicycle frame adjacent to the crank-wheel of a bicycle, said parallelogram device supports said fork;

a control lever for said hinged parallelogram device, said control lever is normally positioned in a neutral position but may be angularly shifted in a first direction to a limit position or angularly shifted from the neutral position in the reverse direction to a limit position;

a third movable fork side is movably mounted beneath the internal side of said fork and is provided with an elastic return system and stops in order to maintain said movable fork in an inactive position which is approximately in the plane of the internal fork side and away from the external fork side; and a pivotal knee lever means hinged to a fixed support on a bicycle frame in a loose manner and hingedly to said movable fork side, said knee lever is pivotted when said control lever is shifted angularly in the first direction from the neutral position to a limit position which in turn moves said movable fork side toward the external fork side thereby urging a chain off a sprocket wheel onto a sprocket wheel of larger diameter, angularly shifting said control lever in the reverse direction from the neutral position to a limit position actuates said hinged parallelogram device moving the sides of said fork so that the external side pulls a chain from a larger sprocket wheel onto a smaller sprocket wheel at the same time said movable fork side is moved toward said external fork side by the combined actions of the internal fork side and said knee lever, said movable fork side after shifting of the chain is returned within approximately the plane of the internal fork side.

2. A device for changing gears as defined by claim 1 wherein said movable fork side is swingingly mounted relative to the internal side of said fork through an intermediary of arms which are oscillatingly mounted on a pin rotated on a bearing portion of the internal fork side, a spring returns said movable fork side to a position of maximal spacing from the external fork side, the spring is wound around the pin with one end of the spring abutting one of the intermediary of arms and with the other end of the spring abutting the internal fork side.

3. A device for changing gears as defined by either claims 1 or 2, wherein one of the intermediary of arms is provided with a slot for pivotal sliding connection with a finger formed at the end of said knee lever through which the swinging motion of said movable fork side is controlled, the finger acts as an engaging dog when said knee lever is pivotted in the first direction by said control lever, and acts as a fulcrum when said fork is shifted in the reverse direction by said control lever.

4. A device for changing gears as defined by claim 1 further comprising a connection means between said control lever and said hinged parallelogram and said knee lever comprising a half rigid rod connected to said control lever and capable of following curves of a bicycle frame, said rod is guided within an orifice formed at the end of an extension of said hinged parallelogram, said rod having a stop between said extension of said hinged parallelogram and a notch formed at the upper end of said knee lever.

5. A device for changing gears as defined by claim 1 wherein said movable fork side extends beneath the internal fork side from the rear of said fork to beyond the front of said fork, said movable fork side has a convex surface for contacting a chain.

6. A device for changing gears as defined by claim 1 wherein said movable fork side is provided with a forward travel stop for limiting the maximal swinging of said movable fork side, the stop comprises an inner edge of an arm which abuts against the internal fork side.

7. A device for changing gears as defined by claim 1 wherein said movable fork side is held in the inactive position by means of a finger on said knee lever means which abuts against a slot on said movable fork side and also by an inner edge of said knee lever abutting against a support on a bicycle.

* * * * *